(12) United States Patent
Oku et al.

(10) Patent No.: US 9,450,252 B2
(45) Date of Patent: Sep. 20, 2016

(54) INSULATING STRUCTURE, FUEL CELL AND FUEL CELL STACK

(71) Applicant: NISSAN MOTOR CO., LTD., Yokohama-shi, Kanagawa (JP)

(72) Inventors: Takanori Oku, Yokohama (JP); Kazuhiro Kageyama, Yokohama (JP)

(73) Assignee: NISSAN MOTOR CO., LTD., Yokohama-Shi (JP)

( * ) Notice: Subject to any disclaimer, the term of this patent is extended or adjusted under 35 U.S.C. 154(b) by 0 days.

(21) Appl. No.: 14/786,068

(22) PCT Filed: Mar. 19, 2014

(86) PCT No.: PCT/JP2014/057520
§ 371 (c)(1),
(2) Date: Oct. 21, 2015

(87) PCT Pub. No.: WO2014/174944
PCT Pub. Date: Oct. 30, 2014

(65) Prior Publication Data
US 2016/0079610 A1    Mar. 17, 2016

(30) Foreign Application Priority Data
Apr. 25, 2013    (JP) ................................. 2013-092043

(51) Int. Cl.
*H01M 8/10* (2016.01)
*H01M 8/02* (2016.01)
*H01M 8/24* (2016.01)

(52) U.S. Cl.
CPC ......... *H01M 8/0202* (2013.01); *H01M 8/0273* (2013.01); *H01M 8/0276* (2013.01); *H01M 8/1004* (2013.01); *H01M 8/242* (2013.01); *H01M 2008/1095* (2013.01); *H01M 2250/20* (2013.01); *Y02E 60/50* (2013.01); *Y02T 90/32* (2013.01)

(58) Field of Classification Search
CPC .......... H01M 8/0202; H01M 8/0273; H01M 8/0276; H01M 8/1004; H01M 8/242; H01M 2008/1095; H01M 2250/20; Y02E 60/50; Y02E 90/32
See application file for complete search history.

(56) References Cited

U.S. PATENT DOCUMENTS 6,861,171 B1    3/2005  Suzuki
2002/0102453 A1    8/2002  Suenaga et al.
(Continued)

FOREIGN PATENT DOCUMENTS

JP    2005-251635 A    9/2005
JP    2007-242334 A    9/2007
(Continued)

*Primary Examiner* — Raymond Alejandro
(74) *Attorney, Agent, or Firm* — Foley & Lardner LLP

(57) ABSTRACT

This insulating structure is for a fuel cell stack or a fuel cell of the fuel cell stack. The fuel cell stack includes a membrane electrode assembly with a peripheral frame and a pair of separators that hold the frame and the membrane electrode assembly in between and is formed by stacking a plurality of sets of the membrane electrode assembly and the pair of separators. The insulating structure includes: a coupling member disposed on at least a part of an outer periphery of the fuel cell stack or the fuel cell; and a projection formed on the coupling member in an area surrounded by the pair of separators and the frame.

19 Claims, 15 Drawing Sheets

(56) References Cited

U.S. PATENT DOCUMENTS

| | | | |
|---|---|---|---|
| 2007/0048585 A1* | 3/2007 | Kino | H01M 8/0206 429/434 |
| 2008/0090129 A1* | 4/2008 | Kunz | H01M 8/0234 429/457 |
| 2009/0068513 A1 | 3/2009 | Shirahama | |
| 2010/0047650 A1* | 2/2010 | Iino | H01M 8/0213 429/479 |
| 2011/0236784 A1 | 9/2011 | Uehara et al. | |
| 2014/0234749 A1 | 8/2014 | Tanaka et al. | |

FOREIGN PATENT DOCUMENTS

| | | |
|---|---|---|
| JP | 2010-123377 A | 6/2010 |
| JP | 2012-133965 A | 7/2012 |
| JP | 2012-243412 A | 12/2012 |
| JP | 2013-037825 A | 2/2013 |
| WO | WO 00/24066 A1 | 4/2000 |
| WO | WO 2013/042542 A1 | 3/2013 |

* cited by examiner

INSULATING STRUCTURE, FUEL CELL AND FUEL CELL STACK

TECHNICAL FIELD

The present invention relates to an insulating structure for a fuel cell stack or a fuel cell of a fuel cell stack, and a fuel cell and a fuel cell stack using the insulating structure.

BACKGROUND ART

A fuel cell stack has been proposed in which increased resonant frequency (natural frequency) of the stack is achieved by a spring component incorporated in the deforming direction of the stack, without the number of parts or the total volume of the stack being increased (see Patent Document 1).

The fuel cell stack includes the stack composed of a stacked plurality of rectangular plate unit cells, end plates disposed on both ends in the stacking direction of the stack, a pair of fastening plates disposed on the second and fourth outer peripheral surfaces of the stack, the four surfaces of the stack parallel to the stacking direction being referred to as the first to fourth outer peripheral surfaces, wherein both of the end plates are coupled to each of the fastening plates, and at least one of the pair of the fastening plates includes a rib extending in the cell stacking direction for holding the stack.

CITATION LIST

Patent Literature

Patent Document 1: Japanese Patent Unexamined Publication No. 2012-133965

SUMMARY OF THE INVENTION

Technical Problem

In the fuel cell stack described in Patent Document 1, it is important, for example, to increase the spring constant of the fuel cell stack or the fastening plates in order to increase the resonant frequency of the fastening plates. However, in this case, since the contact load on the fastening plates and the fuel cell stack is increased, it is required that the relevant part has a structure that is sufficiently strong against the reaction force of the fastening plates. Therefore, the increase of the spring constant is limited to a certain degree.

The present invention was made in view of the problem with the prior art. It is an object of the present invention to provide an insulating structure for a fuel cell which enables applying a high reaction force and a high spring constant, and a fuel cell and a fuel cell stack using the insulating structure.

Solution to Problem

The present inventors conducted a keen study in order to accomplish the above-described object. As a result, they found that the above-described object is accomplished by a structure that includes a coupling member disposed in at least a part of the outer periphery of a fuel cell stack or a fuel cell and a projection formed on the coupling member in an area surrounded by a pair of separators and a frame. The present invention was thus completed.

That is, the insulating structure of the present invention is an insulating structure for a fuel cell stack or a fuel cell of the fuel cell stack, in which the fuel cell stack includes a membrane electrode assembly with a peripheral frame and a pair of separators holding the frame and the membrane electrode assembly in between and is formed by stacking a plurality of sets of the membrane electrode assembly and the pair of separators. The insulating structure of the present invention includes a coupling member disposed on at least a part of the outer periphery of the fuel cell stack or the fuel cell and a projection formed on the coupling member in an area surrounded by the pair of separators and the frame.

The fuel cell or the fuel cell stack of the present invention includes the insulating structure of the present invention.

Further, the method for producing the fuel cell or the fuel cell stack of the present invention involves providing the insulating structure in an integrating step of the fuel cell or the fuel cell structure in a production of the above-described fuel cell or the fuel cell stack of the present invention.

Advantageous Effects of the Invention

According to the present invention, a coupling portion disposed on at least a part of the outer periphery of the fuel cell stack or the fuel cell, and a projection disposed in the coupling member in an area surrounded by the pair of separators and the frame are provided. Therefore, it is possible to provide the insulating structure for a fuel cell stack or a fuel cell of the fuel cell stack that enables the application of a high reaction force and a high spring constant and can thereby prevent or reduce breakage of an insulating part, and the fuel cell and the fuel cell stack using the insulating structure.

DESCRIPTION OF EMBODIMENTS

Hereinafter, the insulating structure, the fuel cell and the fuel cell stack using the insulating structure, and the method for producing the fuel cell or the fuel cell stack of the present invention will be described in detail with reference to the drawings.

First Embodiment

Figure 1:
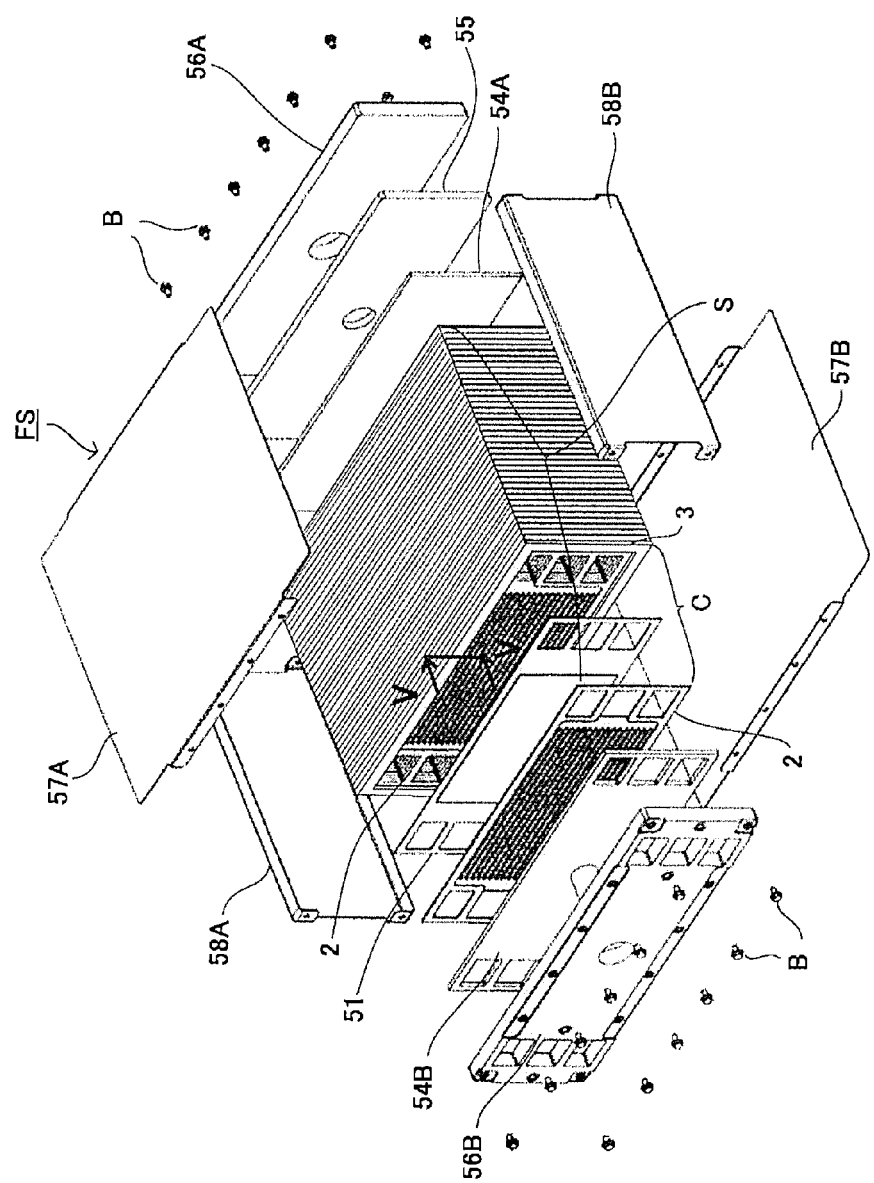
FIG. 1 is a perspective view of an exploded fuel cell stack according to a first embodiment of the present invention.
Figure 2:
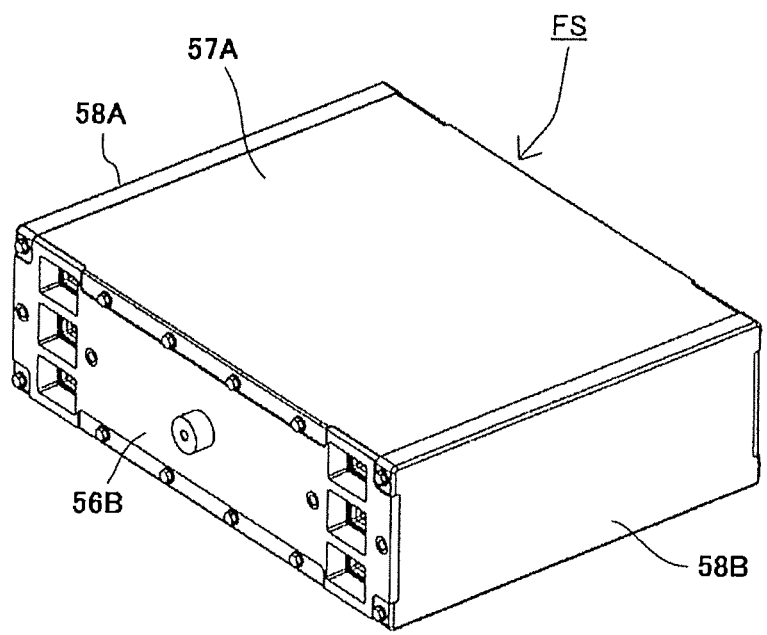
FIG. 2 is a perspective view of the assembled fuel cell stack according to the first embodiment of the present invention.
Figure 3:
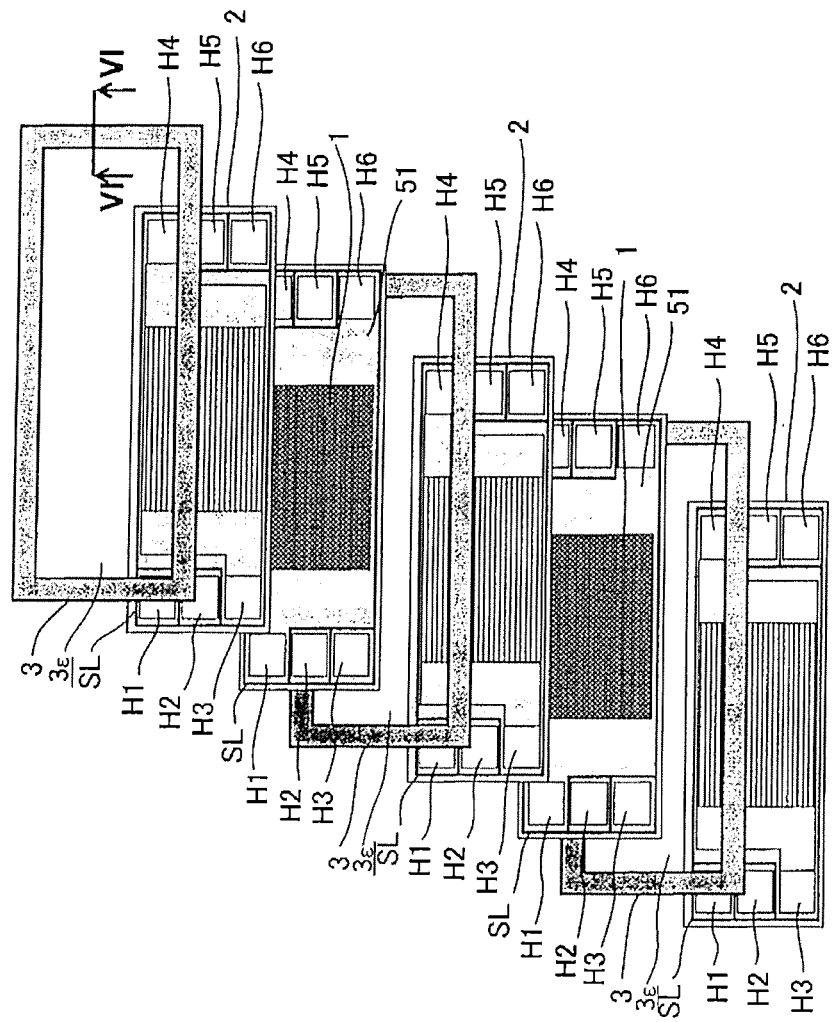
FIG. 3 is a plan view of an exploded fuel cell of the fuel cell stack of FIG. 1.
Figure 4:
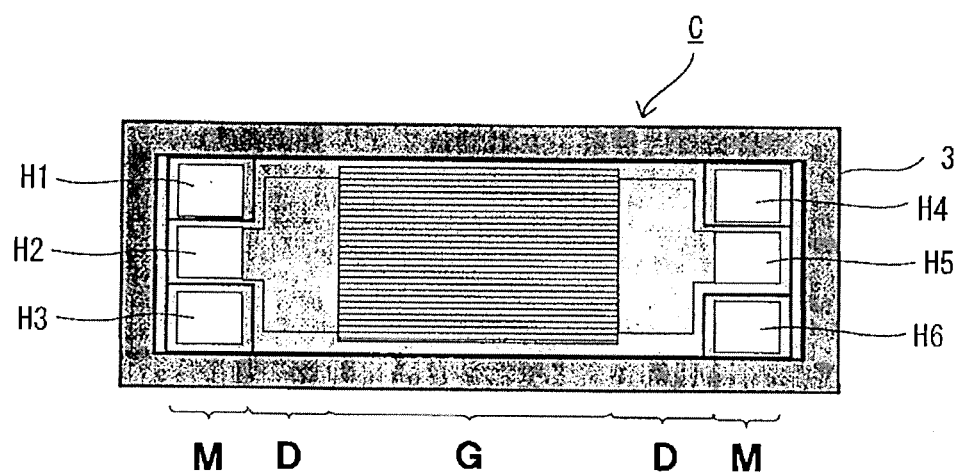
FIG. 4 is a plan view of the assembled fuel cell of the fuel cell stack of FIG. 1.
Figure 5:
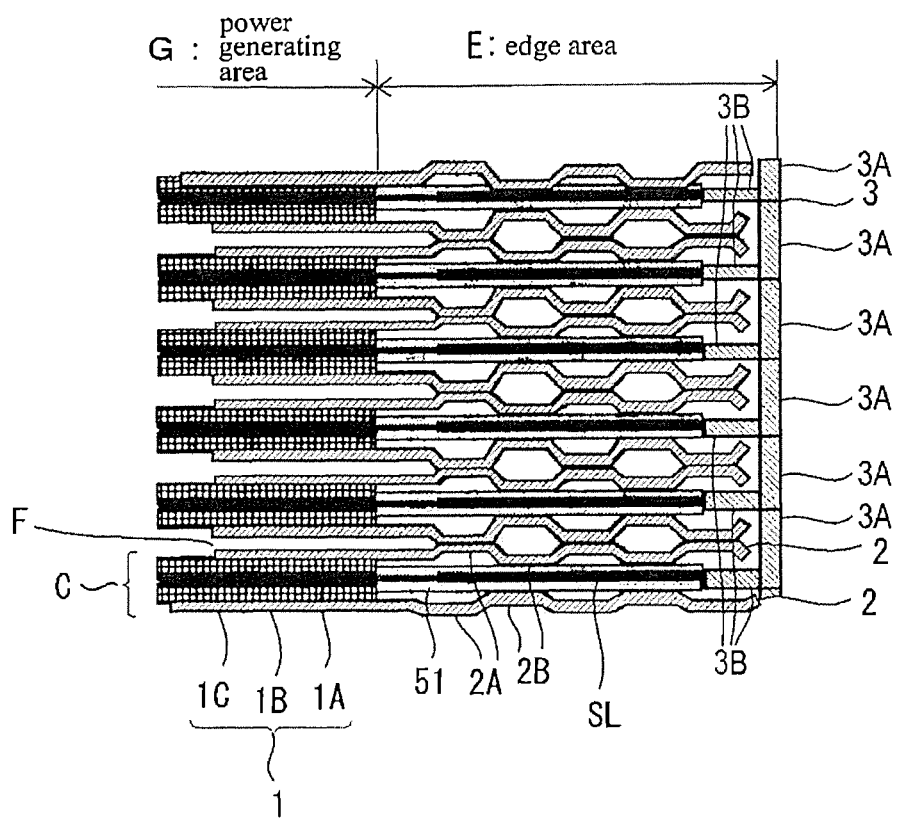
FIG. 5 is a partial cross sectional view of the fuel cell stack taken along the line V-V in FIG. 1.

FIG. 1 is a perspective view of an exploded fuel cell stack according to a first embodiment of the present invention. FIG. 2 is a perspective view of the assembled fuel cell stack according to the first embodiment of the present invention. FIG. 3 is a plan view of an exploded fuel cell of the fuel cell stack of FIG. 1. FIG. 4 is a plan view of the assembled fuel cell of the fuel cell stack of FIG. 1. FIG. 5 is a partial cross sectional view of the fuel cell stack taken along the line V-V in FIG. 1.

The fuel cell stack FS of FIG. 1 includes a stack S of rectangular plate fuel cells C, an end plate 56A disposed on one end in the stacking direction (the right end in FIG. 1) of the stack S via a current collector plate 54A and a spacer 55, and an end plate 56B disposed on the other end via a current collector plate 54B. The fuel cell stack FS further includes fastening plates 57A, 57B disposed on both surfaces of the stack S corresponding to the long sides of the fuel cells C (the upper and lower surfaces in FIG. 1), and reinforcing plates 58A, 58B on both surfaces corresponding to the short sides.

In the fuel cell stack FS, the fastening plates 57A, 57B and the reinforcing plates 58A, 58B are coupled to both of the end plates 56A, 56B by means of bolts B. As described above, the fuel cell stack FS has a case-integrated structure as illustrated in FIG. 2, which restrains and presses the stack S in the stacking direction to apply a predetermined contact pressure to the individual fuel cells C so that the gas sealing property and the electrical conductivity are maintained at a high level.

As illustrated in FIG. 3, each of the fuel cells C, which are referred to as unit cells of the fuel cell stack FS, includes a membrane electrode assembly 1 with a peripheral frame 51, a pair of separators 2, 2 holding the frame 51 and the membrane electrode assembly 1 in between, and an insulating structure 3 that secures insulation between the separators 2 and insulation of the separators 2 from the fastening plates 57A, 57B and the reinforcing plates 58A, 58B. As is described in detail below, the insulating structure 3 includes a projection that ensures insulation between the separators 2 and a coupling member that ensures insulation of the separators 2 from the fastening plates 57A, 57B and the reinforcing plates 58A, 58B.

As illustrated in FIG. 5, the membrane electrode assembly 1, which is generally referred to as an MEA, includes an electrolyte layer 1B of a solid polymer, and an air electrode (cathode) 1C and a fuel electrode (anode) 1A holding the electrolyte layer 1B in between. The membrane electrode assembly 1 generates electricity by an electrochemical reaction when cathode gas (oxygen-containing gas, air) is supplied to the air electrode 1C and anode gas (hydrogen-containing gas) is supplied to the fuel electrode 1A. The membrane electrode assembly 1 may further include a gas diffusion layer of a carbon paper or porous material or the like disposed on the surfaces of the air electrode 1C and the fuel electrode 1A.

The frame 51 is integrated with the membrane electrode assembly 1 by resin molding (e.g. injection molding). In this embodiment, the frame 51 is formed in a rectangular shape with the membrane electrode assembly 1 in the center. The frame 51 has manifold holes H1 to H6 that are arranged such that each end has three manifold holes. Areas from each manifold holes group to the membrane electrode assembly 1 serve as diffuser portions D. The frame 51 and both of the separators 2, 2 have a rectangular shape with substantially the same dimension.

The separators 2 are metal plates in which the faces of one plate oppose the faces of the other plate. For example, the separators 2 are made of stainless steel and may be formed in any suitable shape by press working. The illustrated separators 2 are formed with an uneven cross-sectional shape at least in the center part facing the membrane electrode assembly 1. The uneven cross-sectional shape of the separators 2 continues in the length direction so that the corrugated valleys form gas channels for the anode gas and the cathode gas between the separators 2 and the membrane electrode assembly 1.

Further, each of the separators 2 has manifold holes H1 to H6 at both ends, which are similar to the manifold holes H1 to H6 of the frame 51.

The frame 51 and the membrane electrode assembly 1 and the separators 2, 2 are stacked to form the fuel cell C. As illustrated particularly in FIG. 4, the fuel cell C has a power generating area G in the center, which corresponds to the area of the membrane electrode assembly 1. On both sides of the power generating area G, the fuel cell C includes manifold portions M to supply and discharge reactive gas and diffuser portions D from the respective manifold portions M to the power generating area G where the reactive gas flows.

In the fuel cell C, as illustrated in FIG. 4 and FIG. 5, the area where the membrane electrode assembly 1 is interposed is referred to as the power generating area G as described above, and the area where the frame 51 is interposed is referred to as an edge area E. The edge area E, which includes the manifold portions M and the diffuser portions D, surrounds the power generating area G.

In one of the manifold portions M on the left in FIG. 4, the manifold holes H1 to H3 are configured respectively to supply the cathode gas (H1), to supply cooling fluid (H2) and to supply the anode gas (H3). These manifold holes are communicated with corresponding manifold holes in the stacking direction to form respective channels. In the other manifold portion M on the right in FIG. 4, the manifold holes H4 to H6 are configured respectively to discharge the anode gas (H4), to discharge cooling fluid (H5) and to discharge the cathode gas (H6). These manifold holes are communicated with corresponding manifold holes in the stacking direction to form respective channels. The positional relationship of the manifold holes may be partly or fully reversed in respect of supply and discharge.

As illustrated in FIG. 3 and FIG. 4, the fuel cell C further includes gas sealers SL disposed between the edges of the frame 51 and the separators 2 and around the manifold holes H1 to H6 in the edge area E. When the plurality of fuel cells C are stacked, the gas sealers SL are also provided between the fuel cells C, i.e. between adjacent separators 2.

The gas sealers SL airtightly separate flow areas of the cathode gas, anode gas and cooling fluid from each other in the respective interlayers. Further, the gas sealers SL have openings at suitable locations in the periphery of the manifold holes H1 to H6 so as to allow only a predetermined fluid to flow in the respective interlayers.

As described above, the plurality of fuel cells C, each of which has the above-described configuration, are stacked to form the fuel cell stack FS. As illustrated in FIG. 5, the fuel cell stack FS has a flow space F for the cooling fluid formed between adjacent fuel cells C.

As illustrated in FIG. 5, the separators 2 have recesses 2A that are open to the frame 51 and projections 2B whose apexes face the frame 51 in the edge area E, which are arranged such that the recesses are opposed to each other and the projections are opposed to each other. The recesses 2A and projections 2B are formed along the long sides of the fuel cells C. Further, they are arranged such that a recess 2A is located at the innermost side in the in-plane direction and a projection 2B is located at the outermost side.

Since the pair of separators 2 have a reversed shape from each other as described above, adjacent separators 2 come in contact with each other at the respective recesses (bottoms) 2A when the fuel cells C are stacked. In this way, the flow area F for the cooling fluid formed between adjacent fuel cells C is sealed. In the outer side of the recesses 2, the frame 51 is held between the projections (apexes) 2B of the pair of separators 2 of each fuel cell C.

When the fuel cells C each including the above-described separators 2 form the fuel cell stack FS, they are accommodated in a case with a fixed dimension that is composed of the current collector plates 54A, 54B, the end plates 56A, 56B, the fastening plates 57A, 57B and the reinforcing plates 58A, 58B as illustrated in FIG. 1. In such a fuel cell stack FS, each of the fuel cells C is subjected to a predetermined stacking load and an imperative load due to heat expansion during operation. When no insulating structure is provided, a deformation in the in-plane direction of the cells may cause a buckling of the frame 51.

Figure 6:
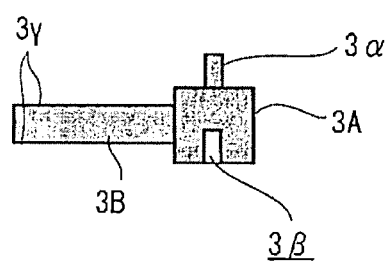
FIG. 6 is a partial cross sectional view of an insulating structure according to the first embodiment of the present invention, taken along the line VI-VI in FIG. 3.

To cope with the problem, the fuel cell stack FS or the fuel cells C thereof according to the first embodiment includes an insulating structure 3 according to the first embodiment that includes coupling members 3A disposed in at least a part of the outer periphery and projections 3B formed on the coupling members 3A and disposed in an area surrounded by the pair of separators 2 and the frame 51 as illustrated in FIG. 3, FIG. 5 and FIG. 6. Specifically, even when a deformation is caused in the in-plane direction of the cells, the insulating structure 3 independent from the frame 51 absorbs the deformation and also serves as an insulator since the insulating structure 3 disposed in a predetermined location comes in contact with the outer peripheral surfaces of the frame 51, the outer peripheral surfaces and the peripheries of the stacking surfaces of the separators 2. Therefore, it becomes possible to apply a high reaction force and a high spring constant and to prevent or reduce breakage of the insulating part. The insulating structure 3 is configured such that a protrusion $3\alpha$ of a coupling member 3A is fitted in and coupled to a recess $3\beta$ of another coupling member 3A (not shown) so that the coupling members 3 extend in the stacking direction of the fuel cell stack FS. The insulating structure can serve not only as an insulator on the outer periphery of the stack S, but also as a jig that regulates the position and controls the adhesive thickness when stacking the membrane electrode assemblies 1 with a peripheral frame 51 and the separators 2 as illustrated in FIG. 3, and when binding them to each other.

In the insulating structure of the fuel cell stack FS or the fuel cells C thereof according to the first embodiment, the projections 3B may have any shape, but may preferably have flat parts $3\gamma$ perpendicular to the stacking direction of the fuel cell stack FS. The flat parts ensure a large contact surface with the peripheries of the stacking surfaces of the separators, and the projections 3B can thereby absorb more deformation. Therefore, it becomes possible to apply a high reaction force and a high spring constant and to prevent or reduce a breakage of the insulating part.

As illustrated in FIG. 1, FIG. 3 and FIG. 4, in the fuel cell stack FS or the fuel cells C thereof according to the first embodiment, the projections 3B of the insulating structure are located in the outer periphery of the fuel cells C along with the coupling members 3A and have a frame shape with an opening $3\epsilon$. With the frame shape, the projections 3B can effectively absorb deformation all over the periphery. Therefore, it becomes possible to apply a high reaction force and a high spring constant and to prevent or reduce breakage of the insulating part.

Second Embodiment

Figure 7:
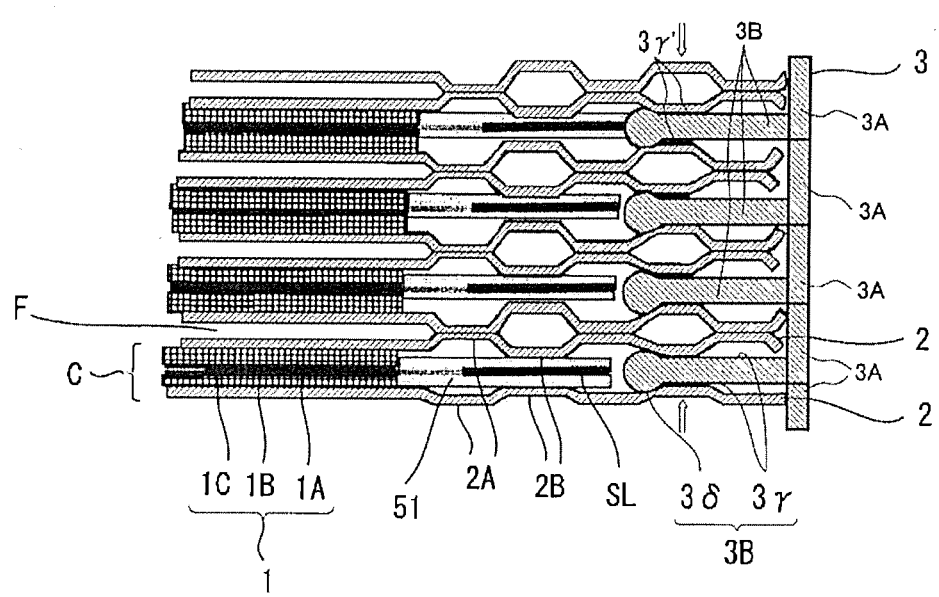
FIG. 7 is a partial cross sectional view of a fuel cell stack according to a second embodiment of the present invention.

FIG. 7 is a partial cross sectional view of a fuel cell stack according to a second embodiment. The same reference signs are denoted to the same components as those of the previous embodiment, and the detailed description is omitted.

In the fuel cell stack FS or the fuel cells C thereof according to the second embodiment, flat parts $3\gamma$ of projections 3B of the insulating structure are at least partially in contact with both of a pair of separators 2, 2, and a fastening load illustrated by the arrow in the figure is applied to the contact parts $\gamma'$ between the flat parts $3\gamma$ and the separators 2, 2 in the stacking direction of the fuel cell stack FS. Since the flat parts $3\gamma$ are in contact with both of the separators 2, 2 and the fastening load is applied thereto, it is possible to absorb more deformation. Therefore, it becomes possible to apply a high reaction force and a high spring constant and to prevent or reduce breakage of the insulating part. The projections 3B may come in contact with the frames 51 at a round part $3\delta$.

Third Embodiment

Figure 8:
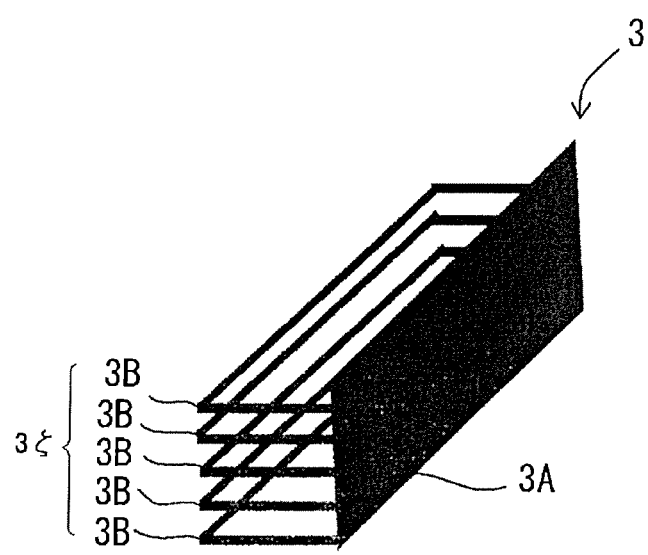
FIG. 8 is a perspective view of an insulating structure according to a third embodiment of the present invention.

FIG. 8 is a perspective view of an insulating structure according to a third embodiment. The same reference signs are denoted to the same components as those of the previous embodiments, and the detailed description is omitted.

The insulating structure 3 according to the third embodiment, which is an insulating structure for a fuel cell stack, includes a coupling member 3A disposed in at least a part of the outer periphery of the fuel cell stack extending in the stacking direction of the fuel cell stack, and projections 3B formed on the coupling member 3A in an area surrounded by a pair of separators 2, 2 and a frame 51. The projections 3B form a comb shape $3\zeta$ in which flat parts perpendicular to the stacking direction of the fuel cell stack are arranged in the stacking direction of the fuel cell stack. Also with this configuration, the insulating structure can absorb a deformation. Therefore, it becomes possible to apply a high reaction force and a high spring constant and to prevent or reduce a breakage of the insulating part. Further, another advantage is that the insulating structure can be installed to the fuel cell stack as a single unit.

Fourth Embodiment

Figure 9:
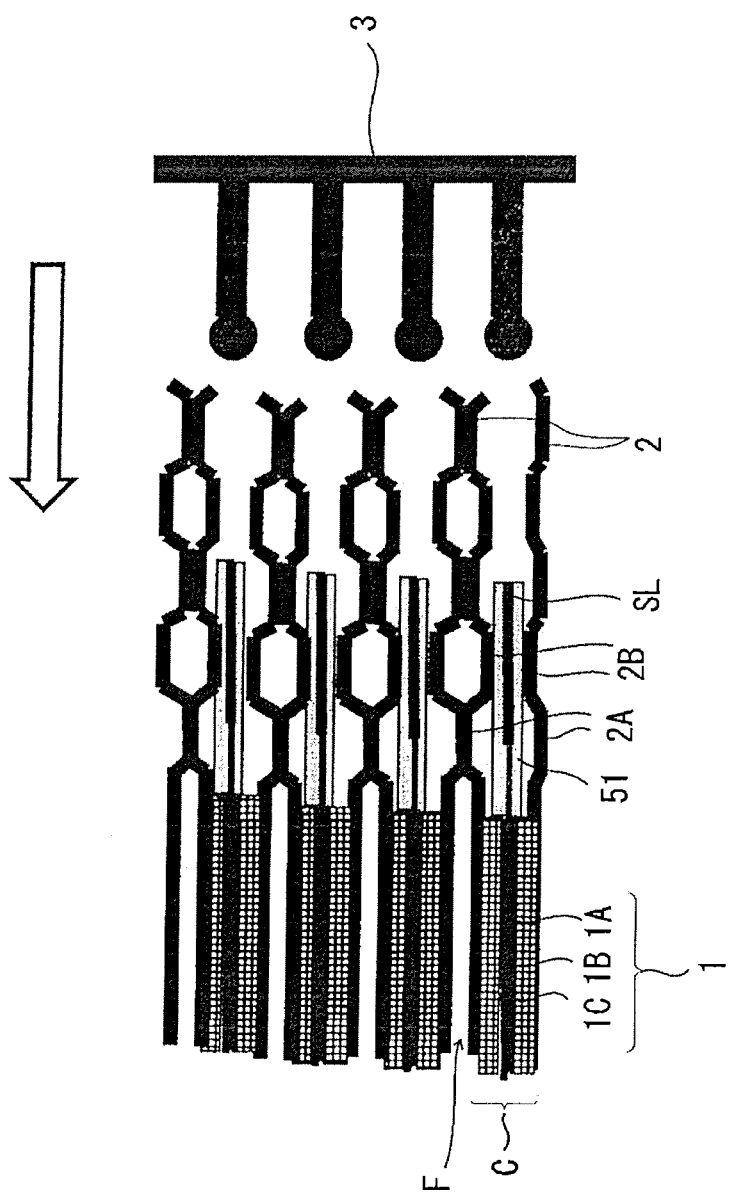
FIG. 9 is an explanatory view of an example of a method for producing a fuel cell stack according to a fourth embodiment of the present invention.

FIG. 9 is an explanatory view of an example of a method for producing a fuel cell stack according to a fourth embodiment. The same reference signs are denoted to the same components as those of the previous embodiments, and the detailed description is omitted.

The method for producing the fuel cell stack according to the fourth embodiment involves providing an insulating structure 3 in an integrating step of the fuel cell stack. Specifically, the insulating structure 3 as illustrated in FIG. 8 is elastically assembled in the direction indicated by the arrow in FIG. 9. In this way, the fuel cell stack as illustrated in FIG. 7 can be easily produced.

Fifth Embodiment

Figure 10:
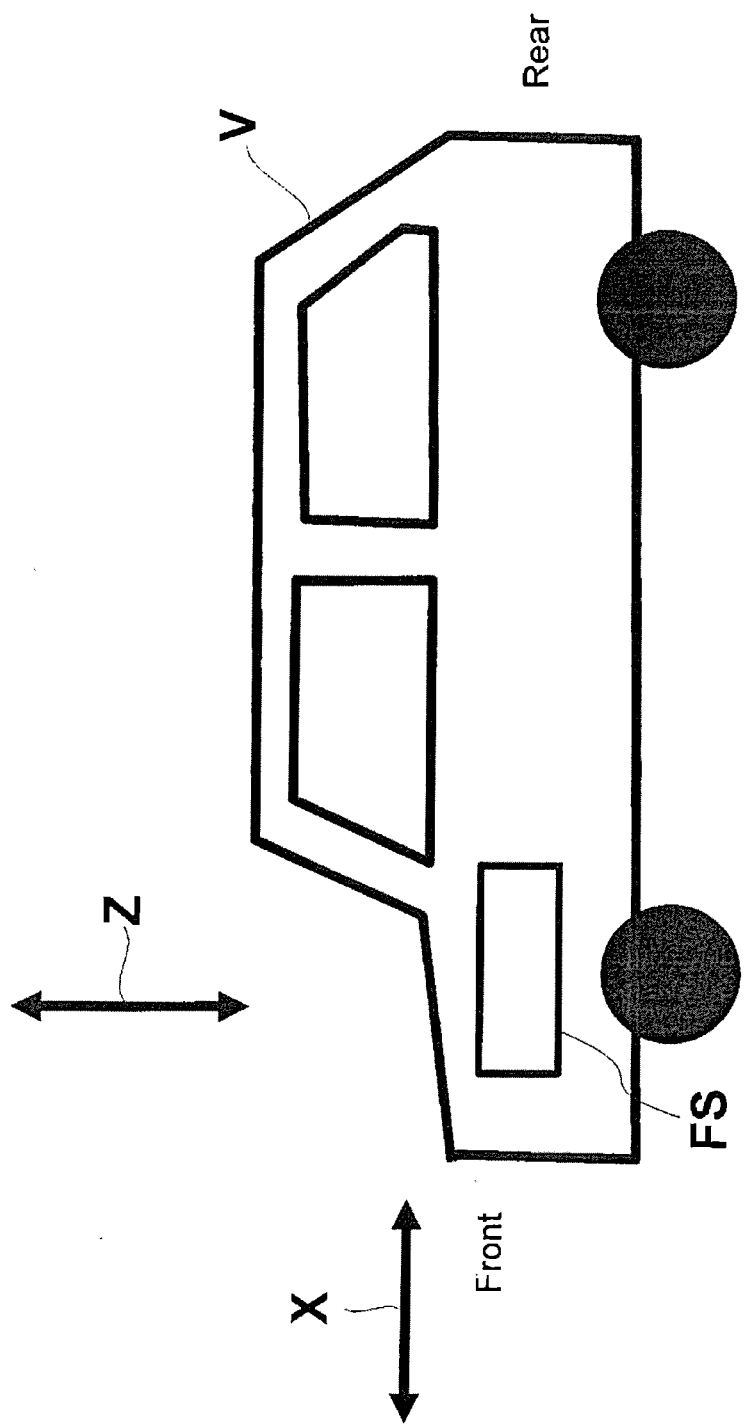
FIG. 10 is a schematic diagram of a vehicle equipped with a fuel cell stack according to a fifth embodiment of the present invention.
Figure 11:
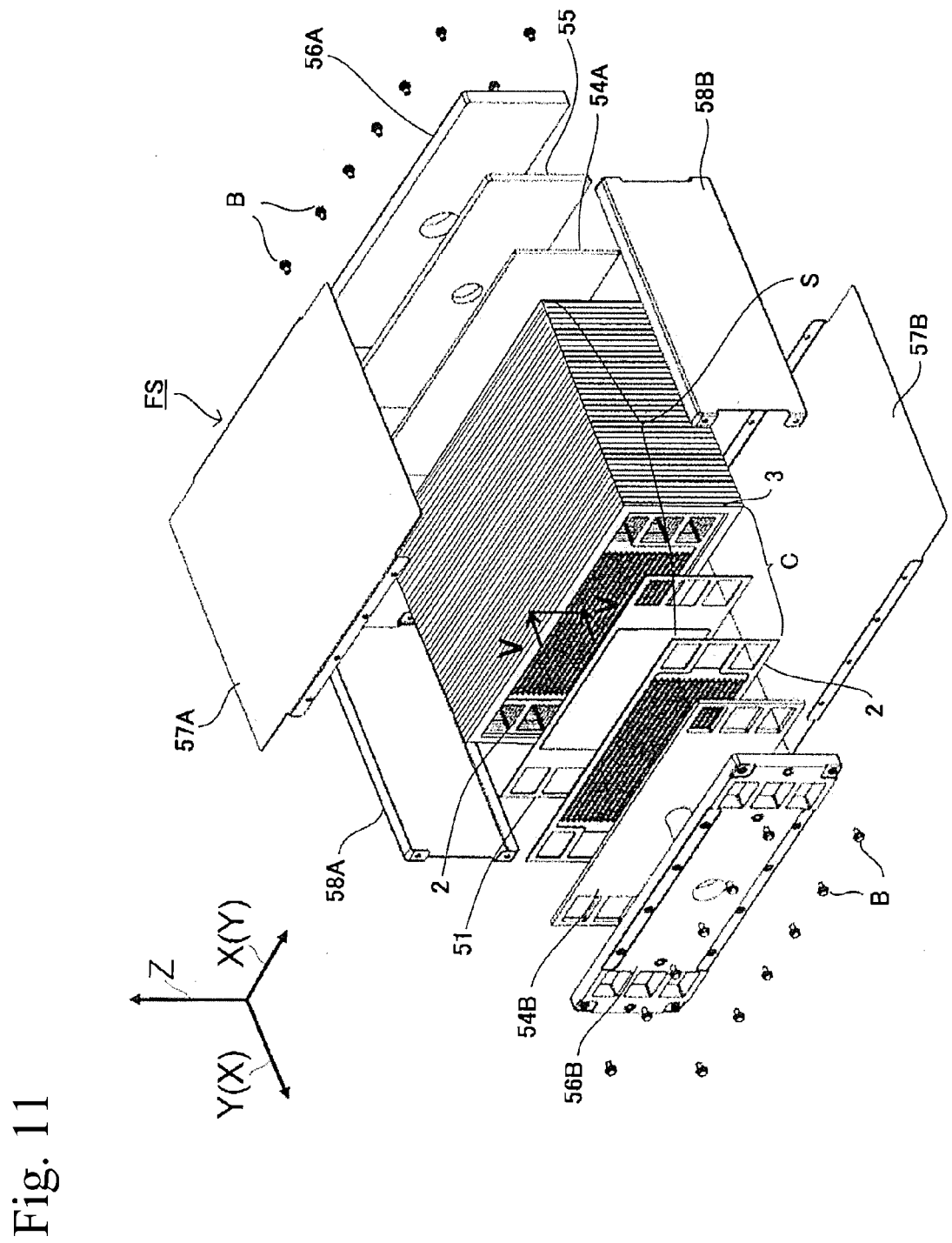
FIG. 11 is a perspective view of the exploded fuel cell stack according to the fifth embodiment of the present invention.
Figure 12:
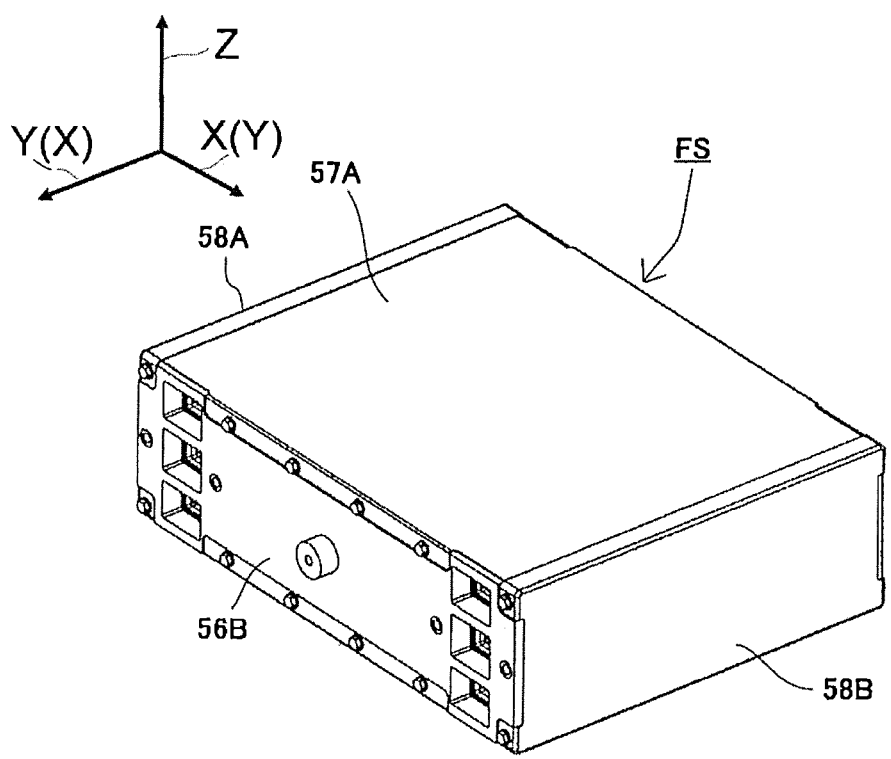
FIG. 12 is a perspective view of the assembled fuel cell stack according to the fifth embodiment of the present invention.
Figure 13:
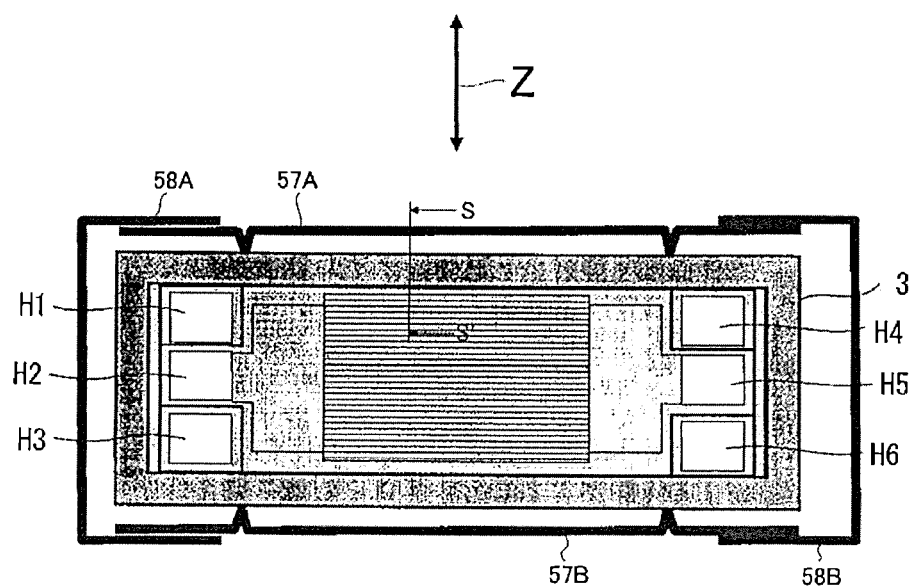
FIG. 13 is a plan view of an assembled fuel cell of the fuel cell stack of FIG. 10.
Figure 14:
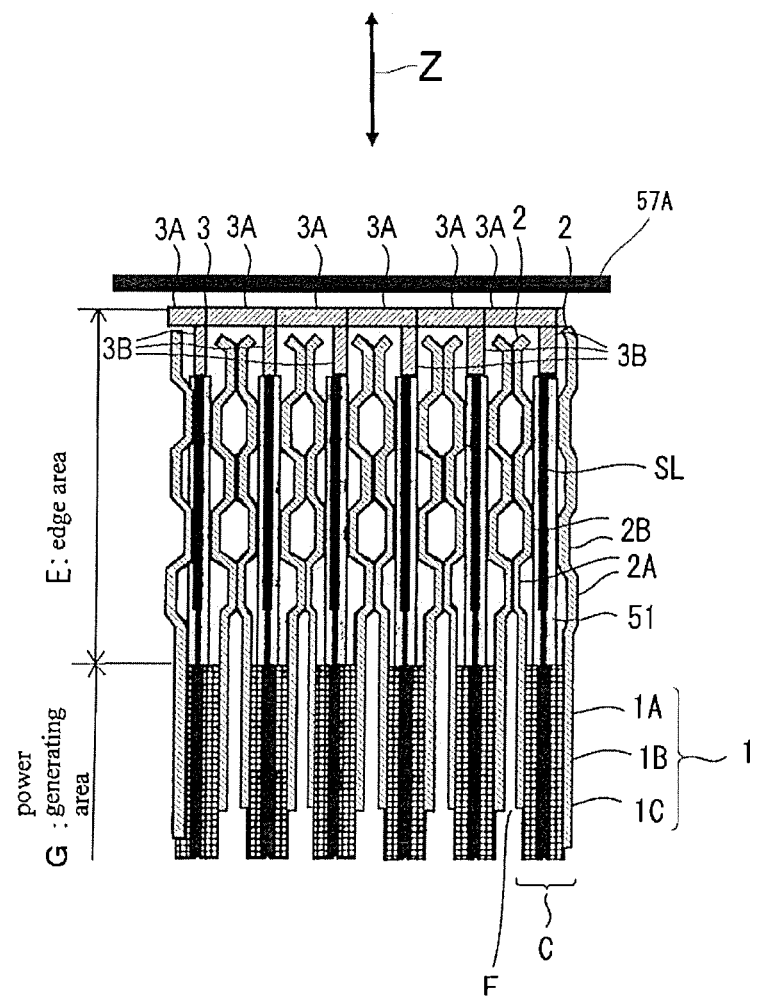
FIG. 14 is a partial cross sectional view of the fuel cell stack taken along the line S-S' in FIG. 13.

FIG. 10 is a schematic diagram of a vehicle equipped with a fuel cell stack according to a fifth embodiment. FIG. 11 is a perspective view of the exploded fuel cell stack according to the fifth embodiment of the present invention. FIG. 12 is a perspective view of the assembled fuel cell stack according to the fifth embodiment of the present invention. FIG. 13 is a plan view of an assembled fuel cell of the fuel cell stack of FIG. 10. FIG. 14 is a partial cross sectional view of the fuel cell stack taken along the line S-S' in FIG. 13. The same reference signs are denoted to the same components as those of the previous embodiments, and the detailed description is omitted.

As illustrated in FIG. 10, the fuel cell stack FS installed in the vehicle V is exposed to vibration, for example, in the front-back direction of the vehicle indicated by the arrow X in the figure and the up-down direction of the vehicle indicated by the arrow Z in the figure. The same applies to the following. Relative to the vibration, the fuel cell stack FS is disposed, for example, as illustrated in FIG. 11 to FIG. 14. Further, the fuel cell stack FS is also exposed to vibration in the left-right direction of the vehicle indicated by the arrow Y in the figure. With the insulating structure 3, even when a vibration is applied, the stack S is securely supported by coupling members 3A and projections 3B of the insulating structure 3. In other words, the resonant frequency is increased. Therefore, the insulation between the separators 2 and the insulation of the separators 2 from the fastening plates 57A, 57B and reinforcing plates 58A, 58B can be secured. In contrast, when the predetermined insulating structure is not provided, since the frame is composed of a frame of a PEN thin film and the like, the insulation of the separators from the fastening plates and reinforcing plates cannot be maintained when an applied vibration causes a buckling of the frame. The insulating structure may be made of any material that has an insulating property. For example, a resin material is suitably used in terms of the capability of attenuating a vibration applied to the frame.

Figure 15:
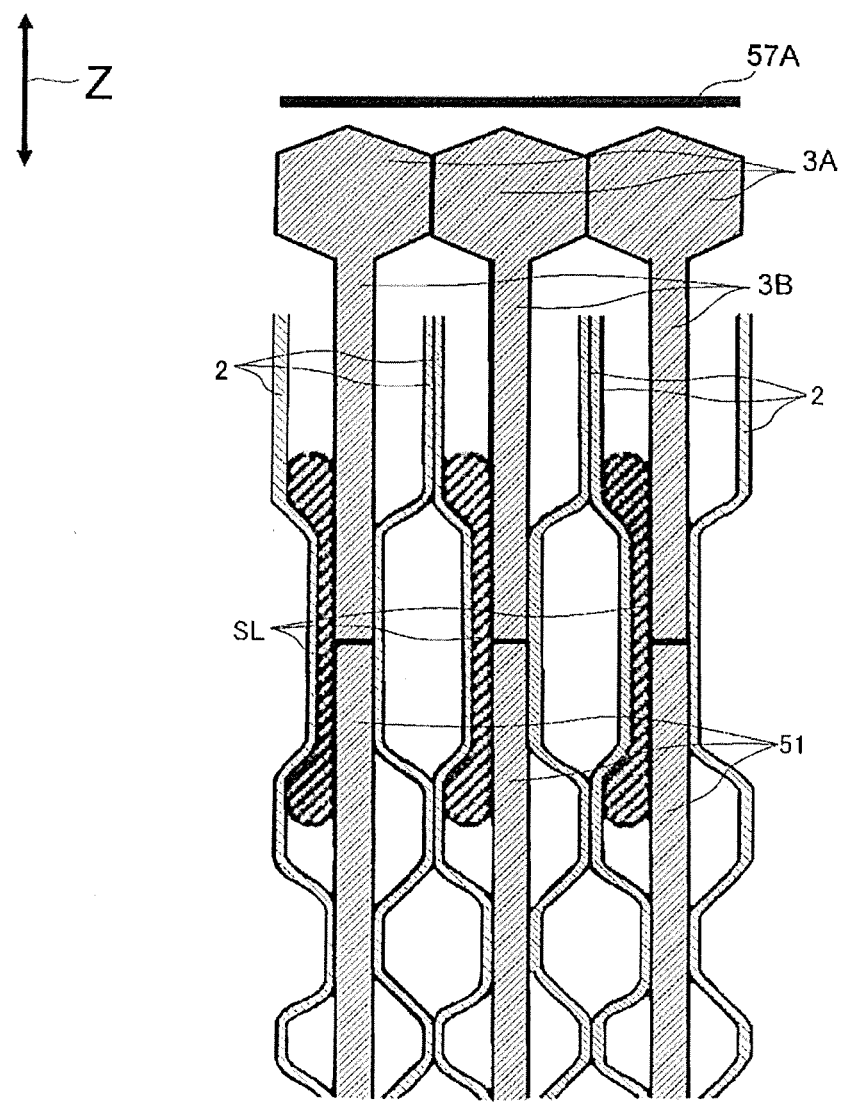
FIG. 15 is a partial enlarged cross sectional view of the fuel cell stack of FIG. 14.

FIG. 15 is an enlarged partial cross sectional view of the fuel cell stack of FIG. 14. The same reference signs are denoted to the same components as those of the previous embodiments, and the detailed description thereof is omitted.

As illustrated in FIG. 15, in the fuel cell stack FS according to the fifth embodiment of the present invention, the coupling members 3A have a tapered (hexagonal) cross section taken along a plane perpendicular to the circumferential direction of the frame. The projections 3B are held between the separators 2, in which one side is in direct contact with a separator 2 while a gas sealer SL is interposed on the other side.

As described above, the coupling members have a cross section taken along a plane perpendicular to the circumferential direction of the frame that gradually narrows in the stacking direction of the fuel cell stack and also in the direction perpendicular to the stacking direction. In response to an applied vibration, the coupling members can plastically deform to attenuate the vibration. This enables the negative influences of an applied vibration to be better prevented or reduced. The location of the projections between the separators provides the advantage of more easily positioning and controlling the adhesive thickness when stacking the membrane electrode assemblies and the separators and when binding them to each other. Although not illustrated in the figure, the sealing property can be improved when the projections are held between the separators via the frames. Further, although not illustrated in the figure, both sides of the projections may be held between the separators by direct contact or via the frames. Further, although not illustrated in the figure, the coupling members may have a cross section taken along a plane perpendicular to the circumferential direction of the frame that gradually narrows only in the stacking direction of the fuel cell stack, or the coupling members may have a cross section taken along a plane perpendicular to the circumferential direction of the frame that gradually narrows only in the direction perpendicular to the stacking direction.

While the present invention is described with some embodiments, the present invention is not limited thereto, and various changes may be made within the gist of the present invention.

For example, the configuration of the insulating structure, the fuel cell and the fuel cell stack according to the above-described embodiments are not limited to the respective embodiments. For example, the configurations of the above-described embodiments may be combined in a different way from the above-described embodiments, and the details of the configurations may be changed.

The entire disclosure of the Japanese Patent Application No. 2013-092043 filed on Apr. 25, 2013 is incorporated herein by reference.

REFERENCE SIGNS LIST

C Fuel cell
E Edge area
G Power generating area
F Flow space
FS Fuel cell stack
1 Membrane electrode assembly
2 Separator
3 Insulating structure
3A Coupling member
3B Projection
3α Protrusion
3β Recess
3γ Flat part
3γ' Contact part
3ε Opening
3ζ Comb shape
51 Frame

The invention claimed is:

1. An insulating structure for a fuel cell stack or a fuel cell of the fuel cell stack, in which the fuel cell stack comprises a membrane electrode assembly with a peripheral frame and a pair of separators that hold the frame and the membrane electrode assembly in between and is formed by stacking a plurality of sets of the membrane electrode assembly and the pair of separators, comprising:

a coupling member disposed on at least a part of an outer periphery of the fuel cell stack or the fuel cell; and a projection formed on the coupling member in an area surrounded by the pair of separators and the frame.

2. The insulating structure according to claim 1, wherein the projection comprises a flat part perpendicular to a stacking direction of the fuel cell stack.

3. The insulating structure according to claim 2, wherein at least a part of the flat part is in contact with both of the pair of separators, and
a fastening load of the fuel cell stack is applied to a contact area between the flat part and the separators.

4. The insulating structure according to claim 1, wherein the projection is disposed on the outer periphery of the fuel cell along with the coupling member and has a frame shape with an open part.

5. The insulating structure according to claim 4, wherein the coupling member has a cross section taken along a plane perpendicular to a circumferential direction of the frame shape that narrows in a stacking direction of the fuel cell stack.

6. The insulating structure according to claim 4 wherein the coupling member has a cross section taken along a plane perpendicular to a circumferential direction of the frame shape that narrows in the direction perpendicular to a stacking direction of the fuel cell stack.

7. The insulating structure according to claim 5, wherein the coupling member has a cross section taken along a plane perpendicular to a circumferential direction of the frame shape that narrows in the direction perpendicular to a stacking direction of the fuel cell stack.

8. The insulating structure according to claim 1, wherein the projection is held between the pair of separators by direct contact or via the frame.

9. The insulating structure according to claim 4, wherein the projection is held between the pair of separators by direct contact or via the frame.

10. The insulating structure according to claim 5, wherein the projection is held between the pair of separators by direct contact or via the frame.

11. The insulating structure for the fuel cell stack according to claim 1, comprising:
the coupling member disposed on at least a part of the outer periphery of the fuel cell stack, extending in a stacking direction of the fuel cell stack; and
a plurality of the projection formed on the coupling member, disposed in the area surrounded by the pair of separators and the frame,
wherein the plurality of the projection form a comb shape in which flat parts perpendicular to the stacking direction of the fuel cell stack are arranged in the stacking direction of the fuel cell stack.

12. The insulating structure for the fuel cell stack according to claim 4, comprising:
the coupling member disposed on at least a part of the outer periphery of the fuel cell stack, extending in a stacking direction of the fuel cell stack; and
a plurality of the projection formed on the coupling member, disposed in the area surrounded by the pair of separators and the frame,
wherein the plurality of the projection form a comb shape in which flat parts perpendicular to the stacking direction of the fuel cell stack are arranged in the stacking direction of the fuel cell stack.

13. The insulating structure for the fuel cell stack according to claim 5, comprising:
the coupling member disposed on at least a part of the outer periphery of the fuel cell stack, extending in a stacking direction of the fuel cell stack; and
a plurality of the projection formed on the coupling member, disposed in the area surrounded by the pair of separators and the frame,
wherein the plurality of the projection form a comb shape in which flat parts perpendicular to the stacking direction of the fuel cell stack are arranged in the stacking direction of the fuel cell stack.

14. The insulating structure for the fuel cell stack according to claim 8, comprising:
the coupling member disposed on at least a part of the outer periphery of the fuel cell stack, extending in a stacking direction of the fuel cell stack; and
a plurality of the projection formed on the coupling member, disposed in the area surrounded by the pair of separators and the frame,
wherein the plurality of the projection form a comb shape in which flat parts perpendicular to the stacking direction of the fuel cell stack are arranged in the stacking direction of the fuel cell stack.

15. The insulating structure for the fuel cell stack according to claim 9, comprising:
the coupling member disposed on at least a part of the outer periphery of the fuel cell stack, extending in a stacking direction of the fuel cell stack; and
a plurality of the projection formed on the coupling member, disposed in the area surrounded by the pair of separators and the frame,
wherein the plurality of the projection form a comb shape in which flat parts perpendicular to the stacking direction of the fuel cell stack are arranged in the stacking direction of the fuel cell stack.

16. The insulating structure for the fuel cell stack according to claim 10, comprising:
the coupling member disposed on at least a part of the outer periphery of the fuel cell stack, extending in a stacking direction of the fuel cell stack; and
a plurality of the projection formed on the coupling member, disposed in the area surrounded by the pair of separators and the frame,
wherein the plurality of the projection form a comb shape in which flat parts perpendicular to the stacking direction of the fuel cell stack are arranged in the stacking direction of the fuel cell stack.

17. A fuel cell comprising the insulating structure for a fuel cell stack or a fuel cell of the fuel cell stack, in which the fuel cell stack comprises a membrane electrode assembly with a peripheral frame and a pair of separators that hold the frame and the membrane electrode assembly in between and is formed by stacking a plurality of sets of the membrane electrode assembly and the pair of separators, comprising:
a coupling member disposed on at least a part of an outer periphery of the fuel cell stack or the fuel cell; and
a projection formed on the coupling member in an area surrounded by the pair of separators and the frame.

18. A fuel cell stack comprising the insulating structure for a fuel cell stack or a fuel cell of the fuel cell stack, in which the fuel cell stack comprises a membrane electrode assembly with a peripheral frame and a pair of separators that hold the frame and the membrane electrode assembly in between and is formed by stacking a plurality of sets of the membrane electrode assembly and the pair of separators, comprising:
a coupling member disposed on at least a part of an outer periphery of the fuel cell stack or the fuel cell; and
a projection formed on the coupling member in an area surrounded by the pair of separators and the frame.

19. A method for producing the fuel cell comprising the insulating structure for a fuel cell stack or a fuel cell of the fuel cell stack, in which the fuel cell stack comprises a membrane electrode assembly with a peripheral frame and a pair of separators that hold the frame and the membrane electrode assembly in between and is formed by stacking a plurality of sets of the membrane electrode assembly and the pair of separators, comprising:
   a coupling member disposed on at least a part of an outer periphery of the fuel cell stack or the fuel cell; and
   a projection formed on the coupling member in an area surrounded by the pair of separators and the frame, or
   the fuel cell stack comprising the fuel cell comprising the insulating structure for a fuel cell stack or a fuel cell of the fuel cell stack, in which the fuel cell stack comprises a membrane electrode assembly with a peripheral frame and a pair of separators that hold the frame and the membrane electrode assembly in between and is formed by stacking a plurality of sets of the membrane electrode assembly and the pair of separators, comprising:
a coupling member disposed on at least a part of an outer periphery of the fuel cell stack or the fuel cell; and
a projection formed on the coupling member in an area surrounded by the pair of separators and the frame, comprising:
providing the insulating structure in an integrating step of the fuel cell or the fuel cell stack.

\* \* \* \* \*